United States Patent
Holcomb et al.

(10) Patent No.: US 7,213,964 B2
(45) Date of Patent: May 8, 2007

(54) FLEXIBLE WHISK

(75) Inventors: David A. Holcomb, Seattle, WA (US); Joshua R. Stewart, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 22 days.

(21) Appl. No.: 10/731,980

(22) Filed: Dec. 10, 2003

(65) Prior Publication Data

US 2005/0128864 A1    Jun. 16, 2005

(51) Int. Cl.
*A47J 43/10* (2006.01)

(52) U.S. Cl. .................................... 366/129

(58) Field of Classification Search ........ 366/129–130, 366/342–343; 15/141.1, 141.2; 99/348; 416/69–70, 227 R, 231 A
See application file for complete search history.

(56) References Cited

U.S. PATENT DOCUMENTS

| | | | | |
|---|---|---|---|---|
| 401,058 A * | 4/1889 | Pfau | .......................... | 416/70 R |
| 843,461 A * | 2/1907 | Husser | .......................... | 416/72 |
| 871,247 A * | 11/1907 | Tomlinson | ................. | 416/70 R |
| 884,085 A * | 4/1908 | Genge | ...................... | 416/70 R |
| 1,195,839 A * | 8/1916 | Moses | ...................... | 416/70 R |
| 1,210,192 A * | 12/1916 | Moses | ...................... | 416/70 R |
| 1,410,522 A * | 3/1922 | Ziemba | .................... | 416/70 R |
| 2,208,337 A * | 7/1940 | Maslow | .................... | 416/70 R |
| 2,499,074 A * | 2/1950 | Nordgarden | .............. | 416/70 R |
| 3,226,825 A | 1/1966 | Molinaro | | |
| 3,412,983 A * | 11/1968 | Kesilman et al. | ......... | 416/70 R |
| 4,735,510 A * | 4/1988 | Barbour et al. | ............. | 366/343 |
| 4,825,552 A * | 5/1989 | Bendickson et al. | .......... | 30/342 |
| 4,836,688 A * | 6/1989 | Bayly | .......................... | 366/342 |
| 5,151,147 A | 9/1992 | Foster et al. | | |
| 5,167,070 A | 12/1992 | Hirzel | | |
| 5,219,223 A * | 6/1993 | Schmitt | ...................... | 366/129 |
| 5,279,035 A | 1/1994 | Cohen et al. | | |
| 5,482,367 A * | 1/1996 | Khan et al. | .................. | 366/129 |
| 5,584,112 A | 12/1996 | Diore et al. | | |
| 5,676,464 A | 10/1997 | Mattar | | |
| 5,688,045 A * | 11/1997 | Butte | .......................... | 366/129 |
| 5,725,305 A * | 3/1998 | Delbor | ........................ | 366/129 |
| 5,788,368 A * | 8/1998 | Anderson et al. | ........... | 366/129 |
| 6,206,561 B1 * | 3/2001 | Hefti | .......................... | 366/129 |
| 6,264,356 B1 * | 7/2001 | Borner | ........................ | 366/129 |
| 6,273,602 B1 * | 8/2001 | Steiner et al. | ............... | 366/129 |
| 6,394,640 B1 | 5/2002 | Astegno et al. | | |
| 6,454,456 B2 | 9/2002 | Browne | | |

(Continued)

FOREIGN PATENT DOCUMENTS

DE        87 09 442 U1    12/1987

(Continued)

*Primary Examiner*—Charles E. Cooley
(74) *Attorney, Agent, or Firm*—Seed IP Law Group PLLC

(57) ABSTRACT

A kitchen whisk having a whisk-head attached to a grippable handle by a coupling, the handle having a flex zone for enhancing the "whipping" action of the whisk-head. A cable can be embedded within the flex zone region of the handle for reinforcing the same, the ends of the cable being disposed between and encased within a handle core and an inner plug core, the inner plug core being located within the coupling. In addition, the coupling captures the ends of the wires for attachment to the handle.

14 Claims, 9 Drawing Sheets

U.S. PATENT DOCUMENTS

| | | | |
|---|---|---|---|
| 6,558,035 B2 * | 5/2003 | Lane | 366/129 |
| 6,764,704 B2 * | 7/2004 | Schub | 366/129 |
| 2002/0003749 A1 | 1/2002 | Browne | 366/129 |
| 2004/0151061 A1 * | 8/2004 | Cheung | 366/129 |
| 2005/0128864 A1 * | 6/2005 | Holcomb et al. | 366/129 |
| 2006/0050606 A1 * | 3/2006 | Overthun et al. | 366/129 |
| 2006/0185150 A1 * | 8/2006 | Holcomb et al. | 29/527.2 |

FOREIGN PATENT DOCUMENTS

| | | | |
|---|---|---|---|
| EP | 600812 A1 * | 6/1994 | |
| EP | 686369 A1 * | 12/1995 | |
| FR | 2458262 * | 1/1981 | |
| FR | 2646765 * | 11/1990 | |
| FR | 2712477 * | 5/1995 | |
| FR | 2 70 989 A1 | 5/1999 | |
| JP | 7-313388 * | 12/1995 | |
| JP | 10-174660 * | 6/1998 | |
| JP | 2002-78624 * | 3/2005 | |
| WO | 03/075728 A1 * | 9/2005 | |

* cited by examiner

FLEXIBLE WHISK

BACKGROUND OF THE INVENTION

1. Field of the Invention

The present invention relates to a kitchen implement, namely, a kitchen whisk.

2. Description of the Related Art

A whisk is a common kitchen utensil used for beating, mixing, or stirring various food products. The basic whisk comprises a handle connected to any one of a variety of whisk-head configurations. Some of the more standard whisk-head configurations can be found in U.S. Pat. No. 6,454,456, for example, a French style whisk having teardrop shaped loops, a Swedish style whisk having a thinner loop of wire wrapped in a helical pattern around a loop of heavy wire, and a flat or "roux" whisk having teardrop shaped loops in a flat configuration. The various whisk-head configurations described in the cited patent are hereby incorporated by reference. Accordingly, the terms "whisk" and "whisk-head" or otherwise known to one of ordinary skill in the art as used in the present invention are not limited to any such configurations, but include, for purposes of the present invention, all like devices for mixing, beating or stirring. Therefore, one of ordinary skill in the art will understand that a "whisk-head" could, for example, be of a fork type configuration used for beating eggs or materials having a more viscous or heavy consistency.

The process of manually mixing, beating, or stirring a food substance can be a tiring job. The basic whisk having a handle and a series of looped wires attached thereto requires a substantial amount of rotational energy supplied to the handle in order to achieve a sufficient amount of whipping motion and velocity/energy at the whisk-head. When attempting to mix relatively viscous food items or when required to mix for a given amount of time to achieve a desired consistency, the basic whisk, regardless of the whisk-head configuration, requires a substantial amount of input energy from the user. Therefore, it is an object of the present invention to provide a whisk device requiring less input energy while still having an enhanced whipping action at the whisk-head for beating, mixing, or stirring operations.

SUMMARY OF THE INVENTION

In accordance with the present invention, one feature is to provide a whisk device with an enhanced whipping motion at the whisk-head for manual beating, mixing, or stirring. The inventive whisk incorporates a resilient flex zone between the handle and the whisk-head. The flex zone permits about 10–15 degrees of whisk-head rotation with respect to the longitudinal axis of the handle. The flex zone material permits the whisk-head to spring back to its natural position; thus providing an enhanced "whipping" motion.

In an alternate embodiment of the invention, the whisk-head may be quickly attached and detached from the handle. Therefore, the handle could be used with a wide variety of whisk-head styles as desired for the application at hand.

In another alternate embodiment of the invention, the resilient flex zone is reinforced with a flexible coupling to increase the strength of the attachment between the whisk-head and the handle.

DETAILED DESCRIPTION OF THE INVENTION

The present invention is generally directed toward a whisk with enhanced whipping action for mixing and stirring food substances. The dynamic flexibility of embodiments of the present whisk requires less input energy by a user, therefore making it easier and more efficient to mix and/or stir viscous food substances. The flexible whisk as described in the embodiments herein may be utilized as a hand-held kitchen utensil or may be configured to attach to an automated mixing device.

The embodiments of the flexible whisk discussed herein are primarily comprised of a whisk-head, a handle, and a flex zone. The configuration of one embodiment of the whisk is discussed in relation to FIGS. 1–9 and one possible alternate embodiment is discussed in relation to FIG. 10. After having reviewed the disclosure, one of ordinary skill in the art will understand that various styles of whisk-heads can be assembled with the present invention with only minor modifications to the components located within the coupling. One of ordinary skill in the art, having reviewed this disclosure, will appreciate variations that can be made to this structure.

Figure 1:
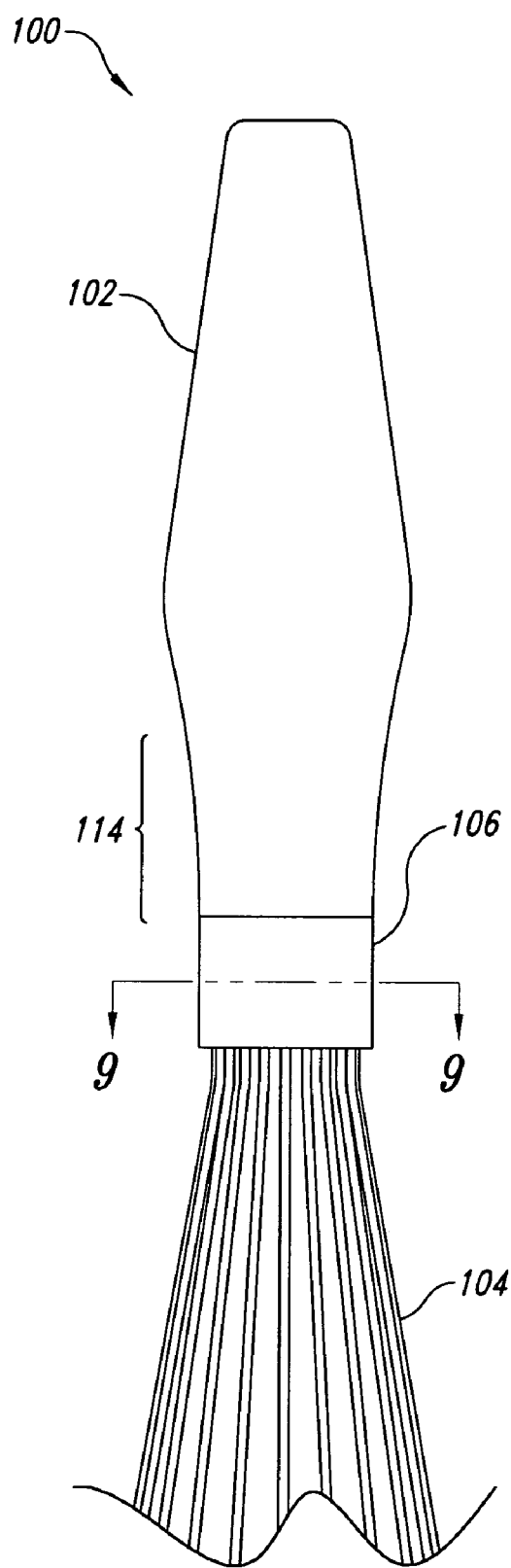
FIG. 1 is a side view of a portion of a whisk according to one embodiment of the present invention.
Figure 2:
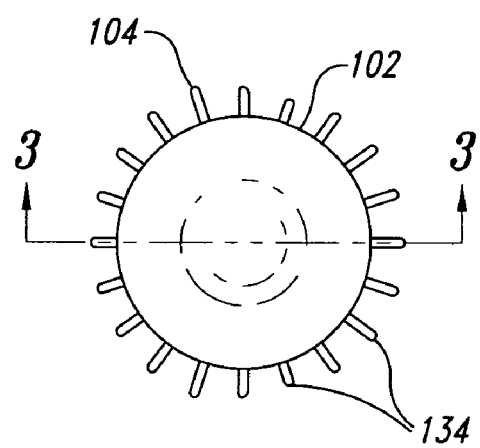
FIG. 2 is a top view of the whisk of FIG. 1.

FIGS. 1 and 2 illustrate one embodiment of a whisk according to the present invention. The resiliently flexible whisk 100 can have a handle 102 having an integrated flex zone 114. The handle 102 can be assembled to a whisk-head 104 through a coupling 106. The whisk-head 104 may be made from stainless steel wires 134, the wires being looped to form the desired whisk shape, for instance tear drop shaped. As one skilled in the art will recognize, the whisk-head wires 134 may be made from any suitable material, for example stainless steel.

Figure 3:
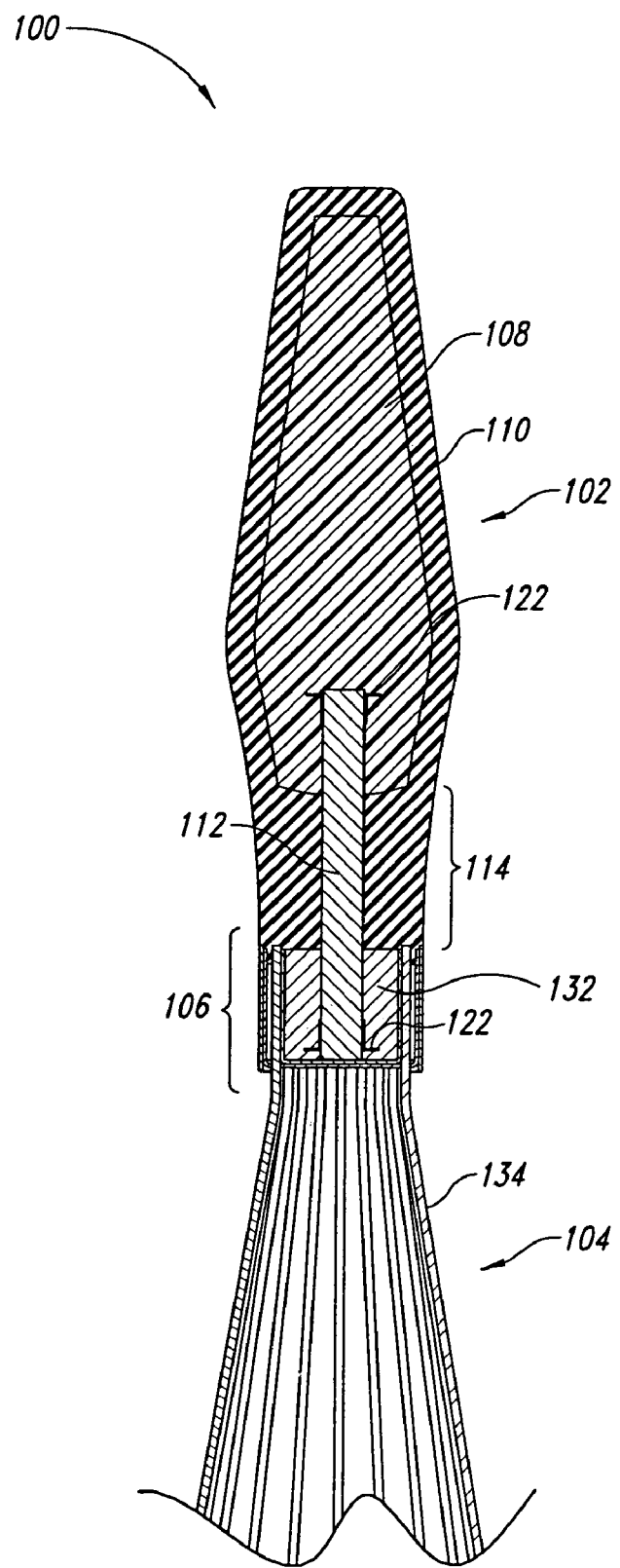
FIG. 3 is a cross-sectional view of the whisk of FIG. 1, viewed along Section 3—3 of FIG. 2.

FIG. 3 provides a cross-sectional view of the flexible whisk 100 viewed along Section 3—3 of FIG. 2. The handle 102 of this embodiment can be formed about a handle core 108, which is encapsulated by a handle cover 110. The handle core 108 may be molded from plastic such as nylon, polypropylene, ABS, or any other material having comparable characteristics. The handle cover 110 can encase the handle core 108 and form an integral flex zone 114 where the distal portion of the flex zone 114 terminates at the coupling 106. The flex zone 114 is a region that allows the whisk-head 104 to resiliently deflect relative to the longitudinal axis of the handle 102 during whisk use. The handle cover 110 and the flex zone 114 may be made from a soft, over-molded thermoplastic elastomer such as SANTOPRENE®, available from the Monsanto Corporation, or TEKBOND®, available from the Teknor Apex Corporation. The durometer range of the handle cover 110 and flex zone 114 material may be in the range of 40–60 shore A. This range can allow for about 10–15 degrees of lateral deflection under heavy whisk use while permitting the whisk-head 104 to quickly "spring back" to its natural (i.e., non-deflected) position. As seen in FIG. 3, the handle cover 110 may be formed quite thick around the handle core 108 and even thicker in the region of the flex zone 114 where a cable 112 may be encased therein and disposed between the coupling 106 and the handle core 108. One of ordinary skill in the art, having reviewed this disclosure, will appreciate variations that can be made to this structure.

Figure 4:
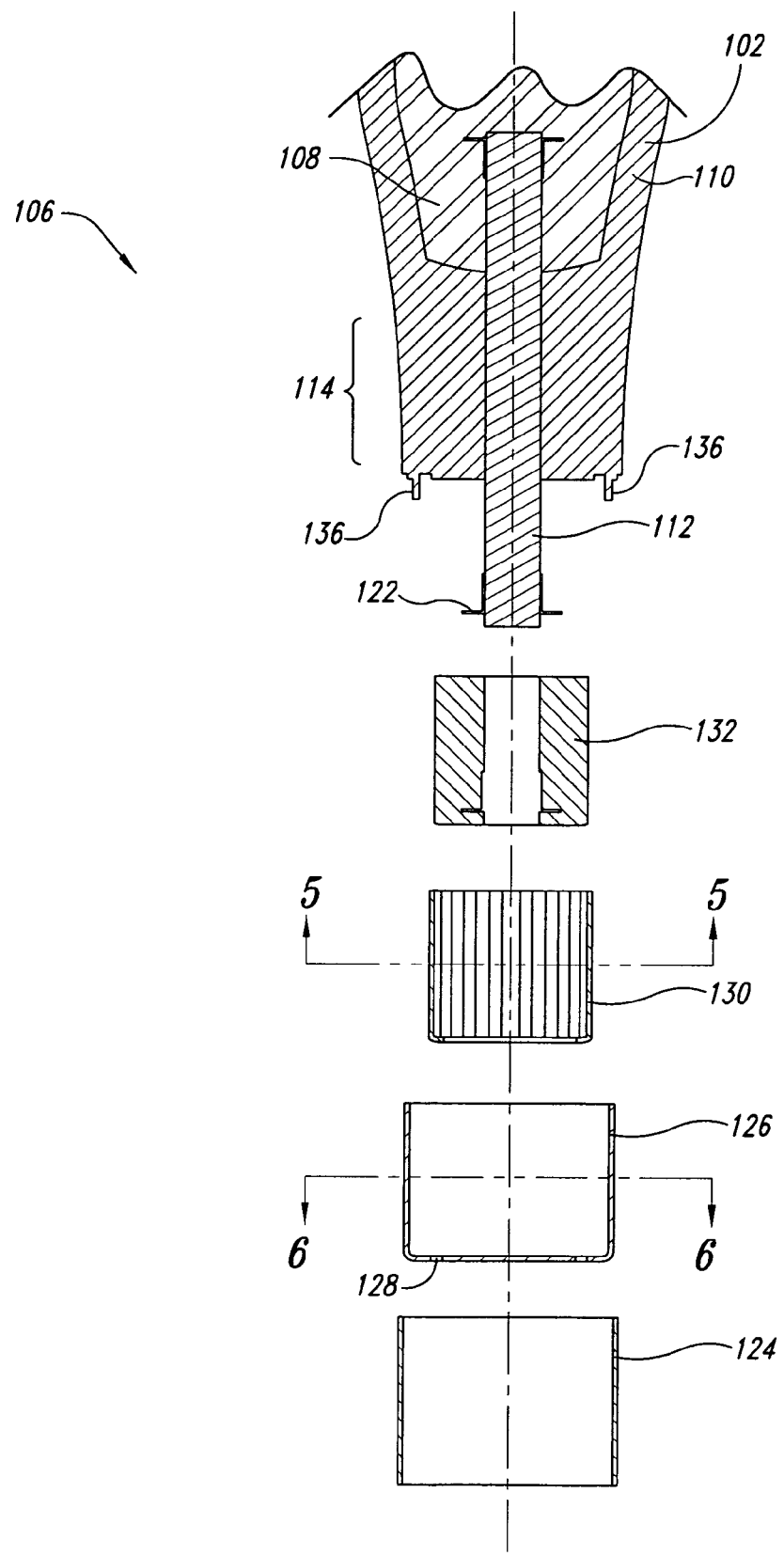
FIG. 4 is an exploded cross-sectional view of a portion of the handle of FIG. 3.

FIGS. 4–7 illustrate the components of the coupling 106 according the present embodiment. FIG. 4, for example, depicts an exploded view of the components comprising the coupling 106. As discussed herein, the various components of the coupling 106 are configured to attach the whisk-head 104 (FIG. 3) to the handle 102. The coupling 106 can be comprised of the cable 112, a collar 124, an outer plug 126, an inner plug 130, and an inner plug core 132.

The inner plug core 132 can be a molded component for fixedly retaining an end of the cable 112 therein. The inner plug core 132 may be molded from the same or similar plastic material as the handle core 108, for example nylon, polypropylene, or ABS. The inner plug core 132 is configured to slidably receive the inner plug 130 thereon.

Figure 5:
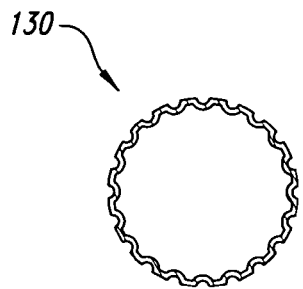
FIG. 5 is a cross sectional view of the inner plug of the handle portion of FIG. 4, viewed along Section 5—5.
Figure 6:
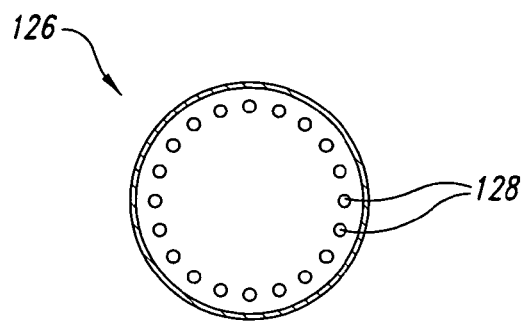
FIG. 6 is a cross sectional view of the outer plug of the handle portion of FIG. 4, viewed along Section 6—6.

As illustrated in FIG. 5, the inner plug 130 may be configured with a gear-like cross section with a plurality of protuberances located on the outer surface of the inner plug 130. Likewise, the outer plug 126 (FIG. 6) can contain a plurality of through holes 128 for receiving the wires 134 (FIG. 3). The outer plug 126 can be configured to slidably fit over the inner plug 130 and retain the free wire ends 134 therein. The free wire ends 134 nest against the vertical sides of the inner plug 130, between the protuberances.

Referring back to FIG. 4, the collar 124 can be configured to slideably fit over the outer plug 126. Each of the components, the inner plug 130, the outer plug 126, and the collar 124 may be made from stainless steel or other suitable materials. Similarly, it is appreciated that one skilled in the art may choose other materials or material coatings for these components provided that such materials have sufficient strength and corrosion resistance properties and are non-toxic for use with food substances, for example, carbon fiber reinforced plastic, titanium, polypropylene, nylon, or ABS.

Figure 7:
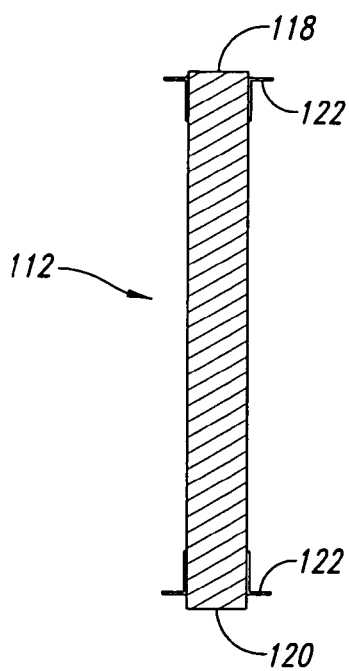
FIG. 7 is a cross sectional view of a cable from the handle portion FIG. 4.

FIG. 7 illustrates the cable 112 for attaching the handle 102 to the whisk-head coupling 106 (FIG. 3). The cable 112 may be braided from stainless steel strands, or be made from other suitable motions andlor structures. An upper cable end 118 and a lower cable end 120 may be attached to grommets 122. Referring back to FIG. 3, it can be seen that the grommets 122 can fixedly retain the cable 112 in the handle core 108 and the inner plug core 132, respectively. The braided cable 112 can reinforce and strengthen the flex zone 114. It is appreciated that one skilled in the art may choose other materials or material coatings for the braided cable 112, provided that such materials have sufficient strength and flexibility, for example, carbon fiber reinforced plastic or titanium. Additionally, one skilled in the art will appreciate that other substantially similar components that have an ample amount of flexibility coupled with sufficient tensile strength may also be used instead of the braided cable.

Figure 8:
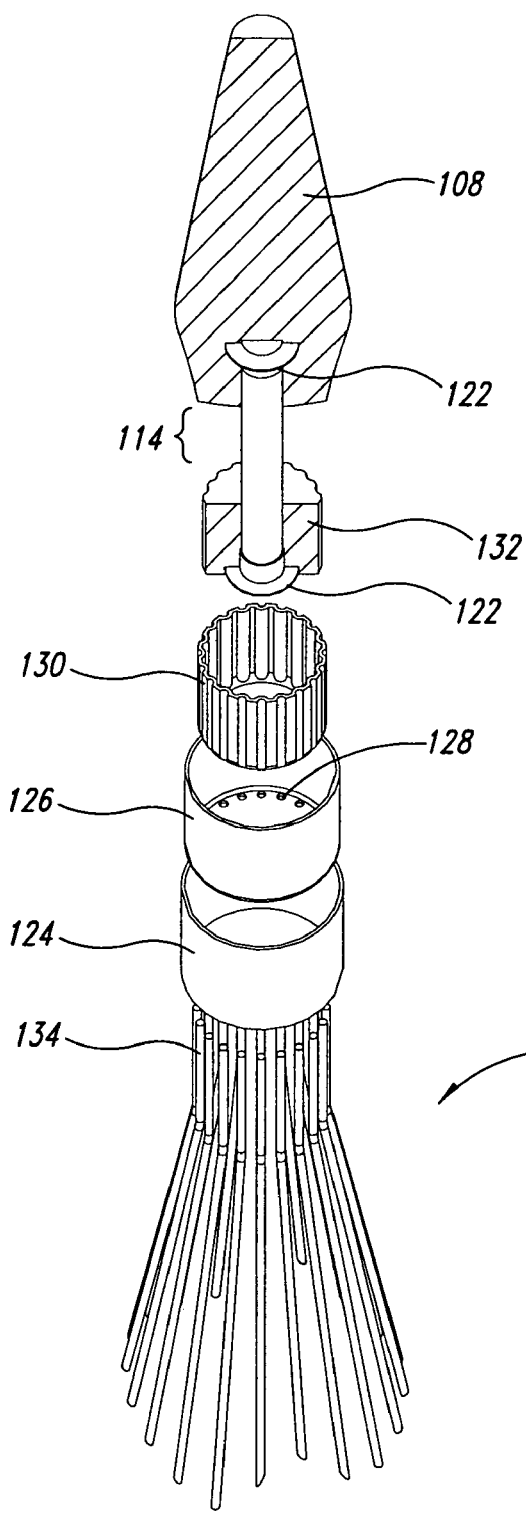
FIG. 8 is an isometric, exploded view depicting the assembly of the whisk of FIG. 3.

FIG. 8 schematically represents the assembly of the flexible whisk 100 according to the present embodiment. For ease of discussion purposes, the assembly steps are disclosed sequentially, however, the assembly steps are not limited to the sequence disclosed. One skilled in the art will further understand that the assembly steps may be accomplished in any order and/or some steps may be combined or done simultaneously.

The assembly of the handle may likely commence by crimping the grommets 122 to each of the cable ends, 118 and 120, respectively. Next, about one quarter of each cable end, 118 and 120 (FIG. 7), respectively, may be partially inserted into two separate molds (molds not shown) such that the remaining intermediate cable portion 114 remains exposed. The mold cavity in which the upper cable end 118 is inserted can be configured to form the shape of the handle core 108; whereas the mold cavity in which the lower cable end 120 is inserted can form the shape of the inner plug core 132. The mold cavities may be injected with plastic or other like material and then permitted to cure, thus forming the hardened plastic handle core 108 and inner plug core 132 wherein the cable ends 118 and 120 are fixedly encased and secured therein by the crimped-on grommets 122.

Figure 9:
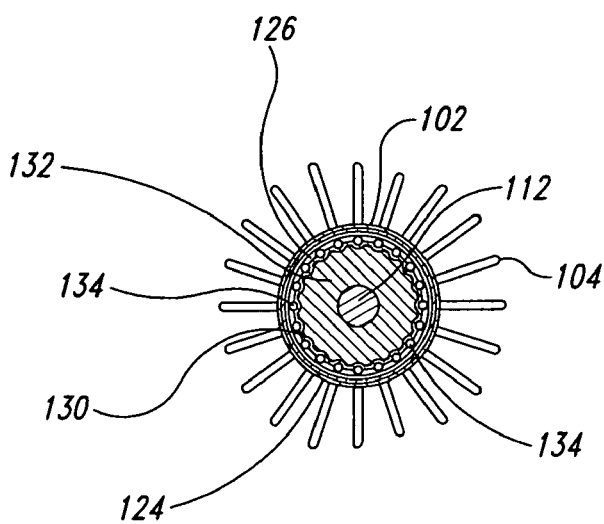
FIG. 9 is a cross sectional view of the whisk of FIG. 1, viewed along Section 9—9.

Next, the wires 134 of the desired whisk-head 104 can be inserted into the plurality of through holes 128 located in the outer plug 126. The inner plug 130 can then be slidably fit into the outer plug 126, capturing the wires 134 therebetween, as best illustrated in FIG. 9. The inner plug 130 and outer plug 126 can provide the retaining means for retaining the wires 134 within the coupling. The wires 134, after the insertion of the inner plug 130 can terminate flush with the upper edges of the inner plug 130 and outer plug 126, respectively. The wires 134 may then be spot welded or otherwise fixed to the inner plug 130, the outer plug 126, or both.

The inner plug 130 may be slidably inserted over the hardened plastic inner plug core 132. To ensure that the inner plug core 132 remains securely fixed to the inner plug 130, the components may be coated with glue or epoxy resin prior to assembly. The entire assembly discussed thus far may then be placed into a final mold where soft, over-molded rubber or a similar material is injected around the handle core 108 and the exposed cable portion 114, thus forming the handle cover 110 (FIG. 3) and the flex zone 114. The injected rubber used to form the handle cover 110 may also fill any voids existing between the inner plug 130 and outer plug 126 as noted by the extended tabs 136 depicted in FIG. 4. The final step in the assembly process can be securing the collar 124 around the outer plug 126 by crimping, clamping, snapping, or welding the collar 124 thereon. The collar 124 can provide the finishing means to aesthetically bridge the region between the handle 102 (FIG. 3) and the whisk-head 104. Plastic may also be applied to the underside of the coupling 106 (FIG. 3) to seal off the through holes where the free ends of the whisk wires were received.

The present invention allows the whisk-head 104 to flex laterally and spring back to its natural position quickly and forcefully; thus providing an enhanced "whipping" motion. The present invention, with the molded handle cover 110 also, results in an easy-to-grip, non-slip handle. The molding of the handle 102 also seals the voids existing between components after assembly, which, in turn, permits easy cleaning and greatly reduces any likelihood of contamination from residual food substances.

Figure 10:
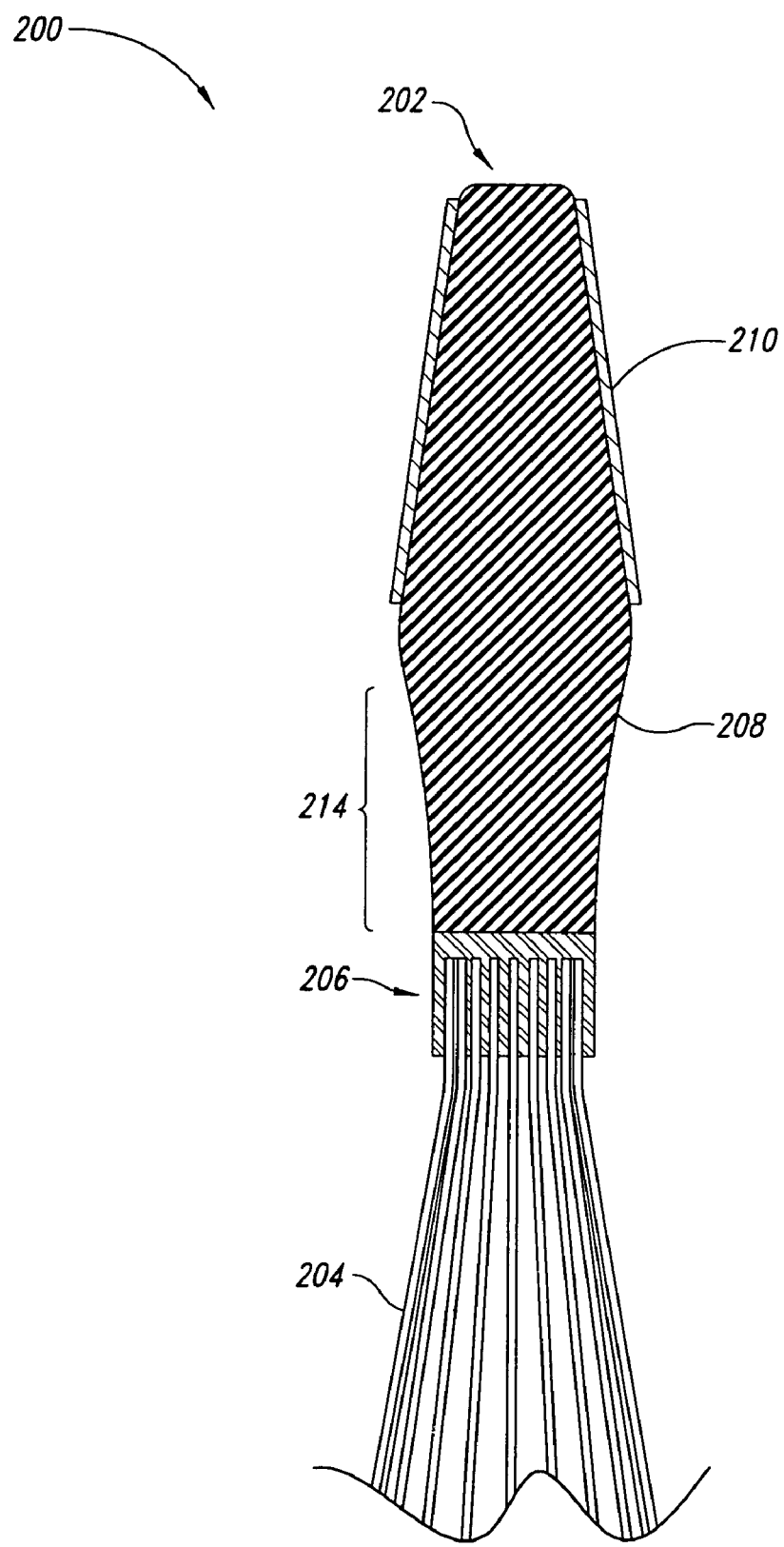
FIG. 10 is a diametric cross-section of a portion of a whisk according to another embodiment of the present invention.

FIG. 10 illustrates an alternate embodiment of the present invention. The alternate embodiment described herein is primarily comprised of a whisk-head, a handle, and a flex zone. The resiliently flexible whisk 200 can have a handle 202 having an integrated flex zone 214. The handle 202 can be assembled to a whisk-head 204 through a coupling 206.

The handle 202 of this alternate embodiment can be formed with a handle core 208, which may be at least partially covered by a handle cover 210. The handle core 208 may be molded from plastic such as nylon, polypropylene, ABS, or any other material having comparable characteristics. The handle core 208 can be configured with an integral flex zone 214 where the distal portion of the flex zone 214 terminates at the coupling 206. The flex zone 214 is a region that allows the whisk-head 204 to resiliently deflect relative to the longitudinal axis of the handle 202 during whisk use. The handle core 208 with the integral flex zone 214 may be made from a soft, over-molded thermoplastic elastomer such as SANTOPRENE®, available from the Monsanto Corporation, or TEKBOND®, available from the Teknor Apex Corporation. The handle cover 210 may be made from a more rigid material to provide a bit more stiffness to the handle 202 and for enhanced gripping of the handle 202.

The coupling 206 of the present alternate embodiment can be configured to attach the whisk-head 204 to the handle 202. The coupling 206 can be comprised of the components discussed in the previous embodiment, however, without the cable. One of ordinary skill in the art, having reviewed this disclosure, will appreciate variations that can be made to this structure.

Figure 11:
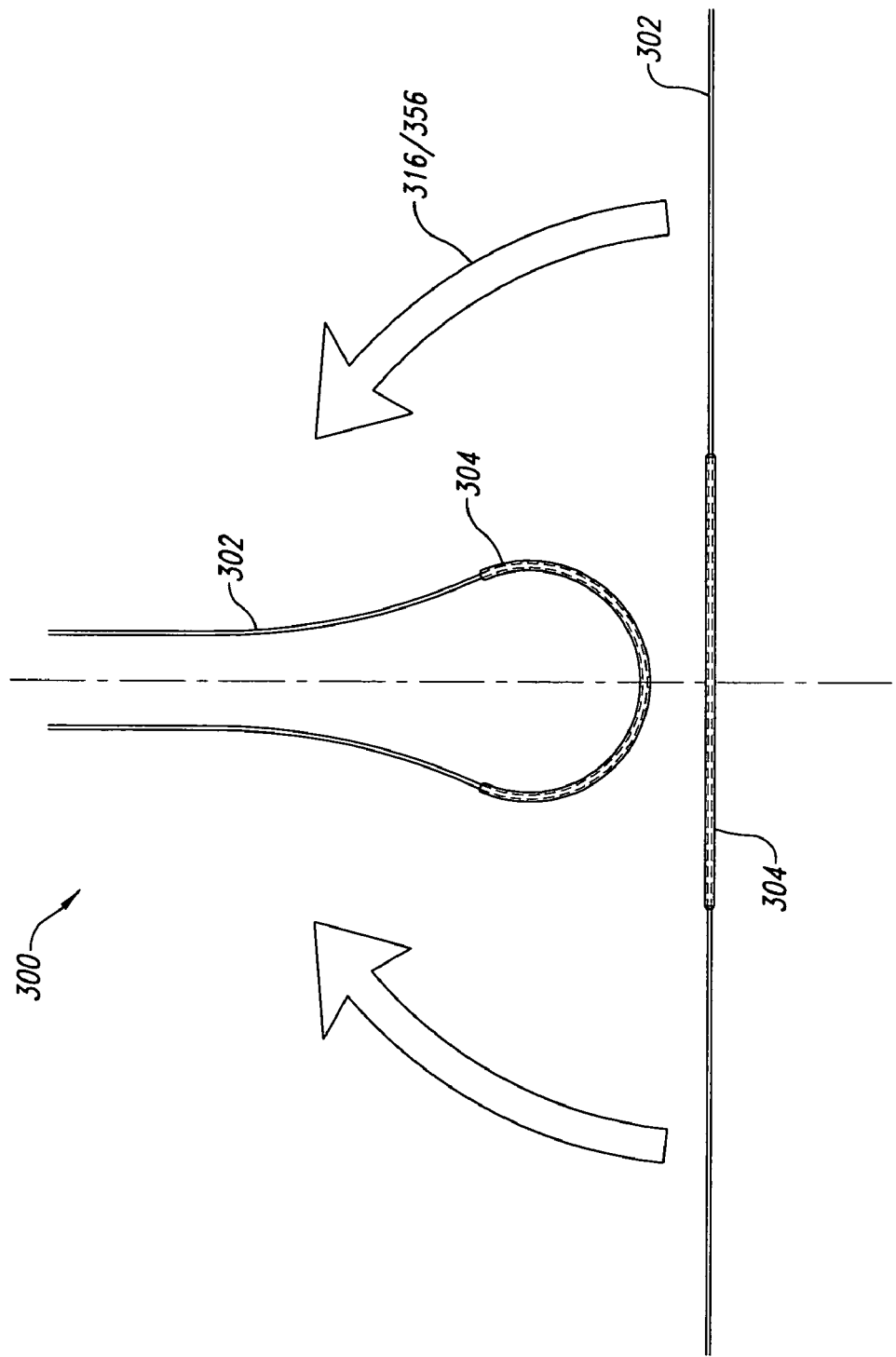
FIG. 11 is a side view of a whisk-head wire assembly including a wire and a flexible material.

The whisk-head wires described in the above embodiments may also be over-molded with a flexible material, which helps to preserve the surface of any mixing vessel and to reduce noise. FIG. 11 illustrates one embodiment of a wire assembly 300 where at least a portion of the exterior surface of the whisk-head wire 302 is covered with a flexible material 304, for example silicone, TEFLON®, or some other type of plastic.

Figure 12:
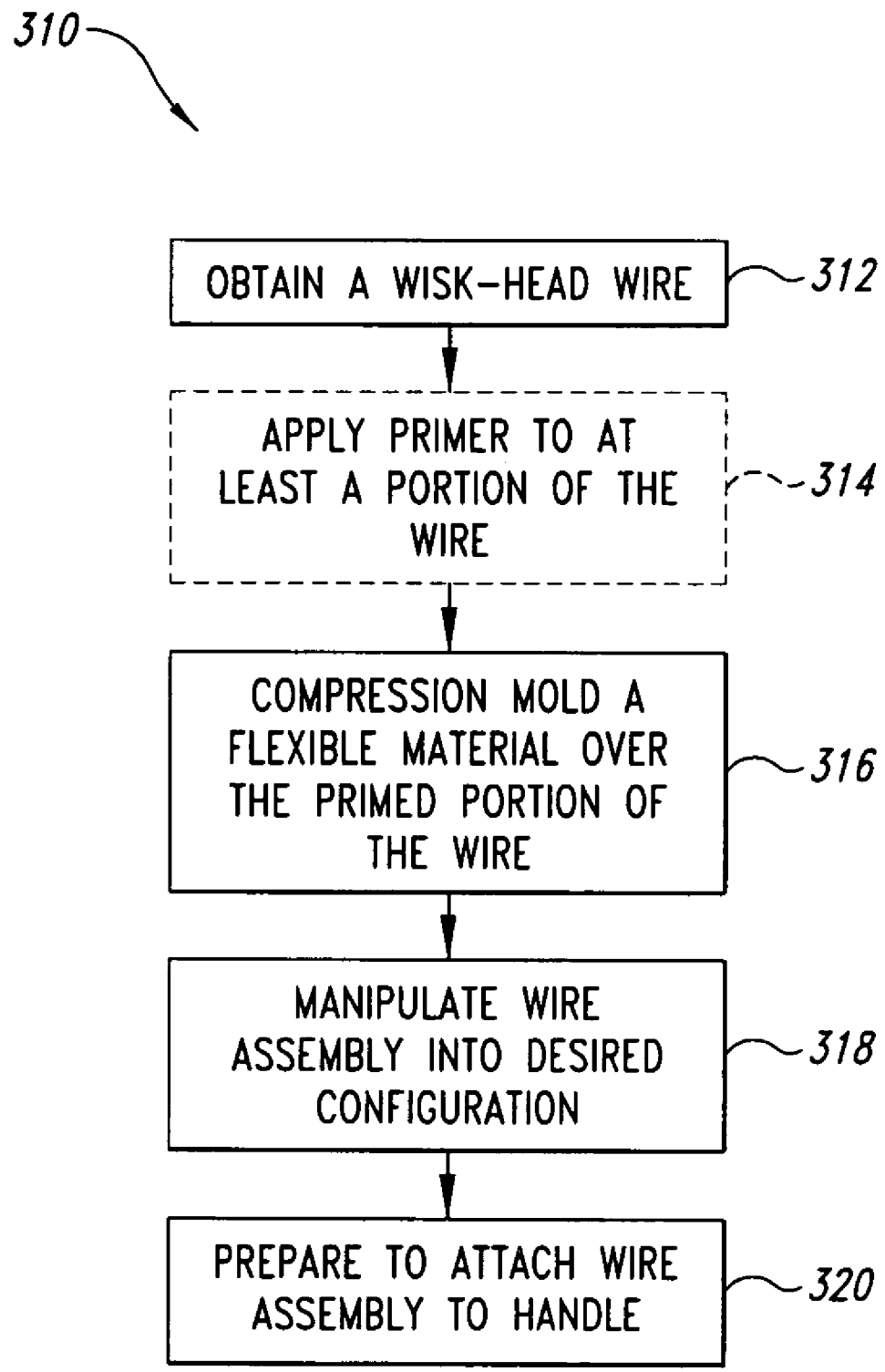
FIG. 12 is a flow diagram of one method of producing the wire assembly of FIG. 11.

FIG. 12 illustrates one method 310 of producing the wire assembly 300 illustrated in FIG. 11. In Step 312, a whisk-head wire 302 that has not been manipulated into any specific shape can be obtained from a stock of wire. For example, a straight whisk-head wire 302 could be used. Optionally, in Step 314, at least a portion of the wire can be primed. The type of primer used may be any number of resins or adhesives capable of bonding plastic, rubber or any other type of flexible material to metal. If the wires are covered with a material other than silicone, then the use of a primer may not be necessary. In Step 316, a flexible material 304 can be compression molded over at least the primed portion of the whisk-head wire 302 to create the wire assembly 300. In Step 318, the wire assembly 300 can be manipulated into any desired configuration such as the teardrop shape or any of the shapes discussed previously. In Step 320, the wire assembly 300 can be attached to the handle of the whisk.

Figure 13:
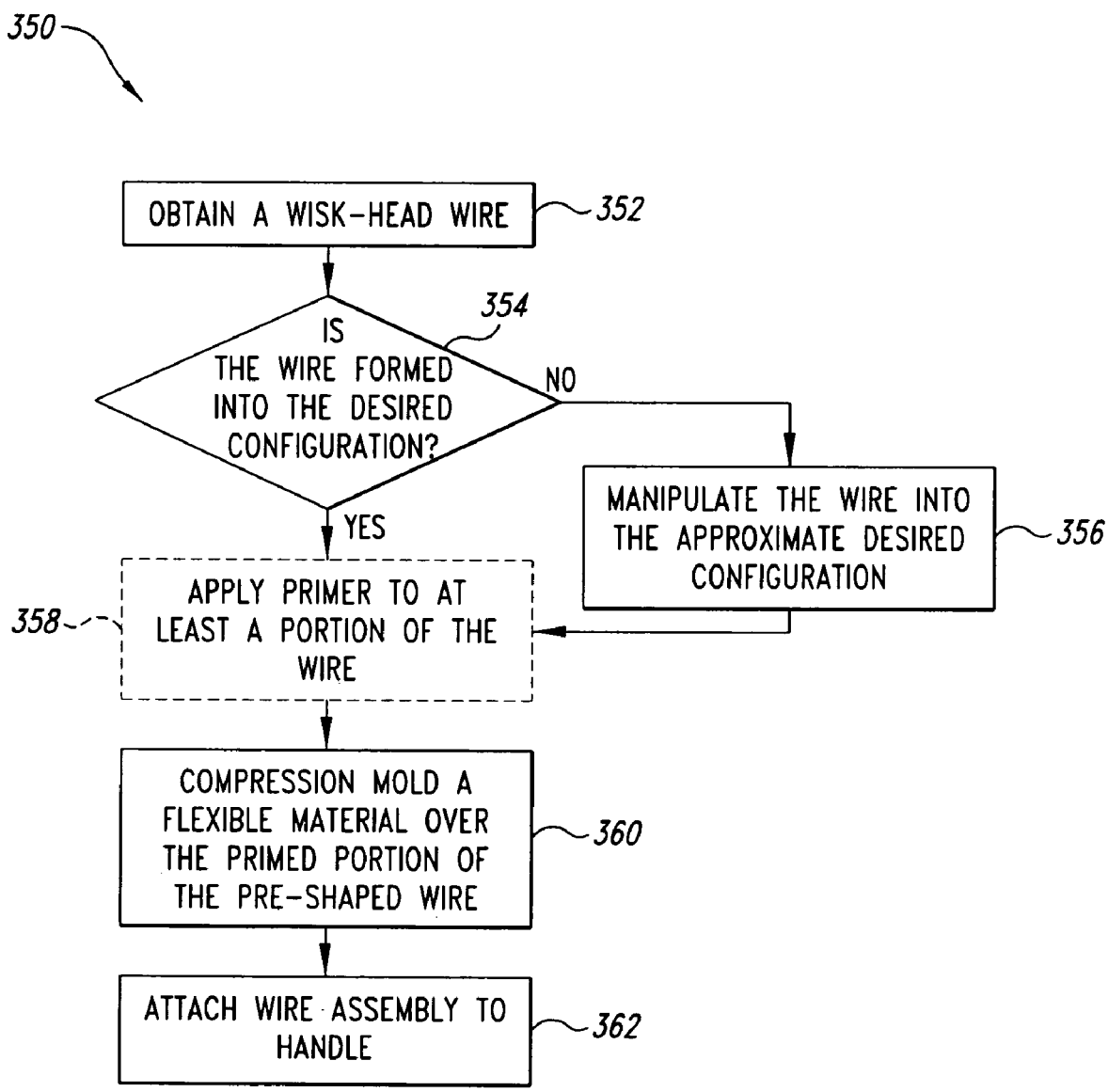
FIG. 13 is a flow diagram of an alternate method of producing the wire assembly of FIG. 11.

FIG. 13 illustrates an alternate method 350 of producing the wire assembly 300 illustrated in FIG. 11. In Step 352, a whisk-head wire 302 can be obtained. In Step 354, if the whisk-head wire 302 has not been pre-shaped, then in Step 356, the wire 302 can be manipulated into a shape that at least approximates the desired configuration. Either before or after Step 356 is performed, the optional Step 358 can be accomplished. In Step 358, a primer may be applied to at least a portion of the wire. However, primer may not be necessary if a material other than silicone is used. In Step 360, a flexible material 304 can be compression molded over the primed portion of the pre-shaped wire 302 to create the wire assembly 300. In Step 362, the wire assembly 300 can be attached to the handle of the whisk. In the present method, pre-shaping the whisk-head wire 302 and then compression molding the flexible material 304 thereon produces the wire assembly 300. The advantage of pre-shaping the wire 302 in the present method is to minimize the likelihood that the flexible material 304 will crack, tear, or disbond when the wire assembly 300 is manipulated.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A kitchen whisk comprising:
a whisk-head having a plurality of wire segments configured to function as a whisk;
a handle having a cover formed about a core, at least a portion of the handle forming a flex zone for biasly permitting deflection of the whisk-head and urging the whisk-head back toward its natural position while in use; and
a coupling connecting the whisk-head to the handle, the coupling having a cable disposed between the core and the coupling, the cable encased within the flex zone for reinforcement thereof, and the coupling having a capturing means for attaching the whisk-head with the coupling.

2. The kitchen whisk of claim 1 wherein the whisk-head is made from looped wires having a tear dropped shape.

3. The kitchen whisk of claim 1 wherein at least a portion of each of the wires are covered with a flexible material.

4. The kitchen whisk of claim 1 wherein the cover and flex zone are made from an over-molded thermoplastic elastomer.

5. The kitchen whisk of claim 1 wherein the core is made from a molded plastics material such as nylon, polypropylene, or ABS.

6. The kitchen whisk of claim 1 wherein the cable is made from stainless steel.

7. A kitchen whisk comprising:
a whisk-head having a pluraLity of wire segments configured to function as a whisk;
a handle having a cover formed about a core, at least a portion of the handle forming a flex zone for biasly permitting deflection of the whisk-head and urging the whisk-head back toward its natural position while in use;
a coupling connecting the whisk-head to the handle, the coupling having a cable disposed between the core and the coupling, the cable encased within the flex zone for reinforcement thereof, and the coupling having a capturing means for attaching the whisk-head with the coupling; and
a grommet at each end of the cable, a first cable end encased in the core and a second cable end encased in an inner plug core.

8. The kitchen whisk of claim 7 wherein the inner plug core is made from a molded plastic material such as nylon, polypropylene, or ABS.

9. The kitchen whisk of claim 7, further comprising an inner plug and an outer plug configured such that the wires are captured therebetween, and the inner plug configured to receive the inner plug core.

10. The kitchen whisk of claim 9 wherein the inner plug and outer plug are made from Stainless Steel.

11. The kitchen whisk of claim 9 wherein the outer plug is comprised with a plurality of holes for insertably receiving the whisk-head wire ends.

12. The kitchen whisk of claim 9 wherein the inner plug is configured with a gear-like cross section such that the whisk-head wire ends nest between vertically oriented gear-like protuberances of the inner plug and the outer plug.

13. The kitchen whisk of claim 12 wherein the whisk-head wire ends are spot welded to at least one of either the inner or outer plugs.

14. The kitchen whisk of claim 7, further comprising a collar attachable around the coupling and made from stainless steel.

* * * * *

UNITED STATES PATENT AND TRADEMARK OFFICE
CERTIFICATE OF CORRECTION

| | |
|---|---|
| PATENT NO. | : 7,213,964 B2 |
| APPLICATION NO. | : 10/731980 |
| DATED | : May 8, 2007 |
| INVENTOR(S) | : David A. Holcomb et al. |

It is certified that error appears in the above-identified patent and that said Letters Patent is hereby corrected as shown below:

<u>Page2</u>
Item 56, References Cited, Foreign Patent Documents, "FR 2 70 989 A1" should read as --FR 2 770 989 A1--.

<u>Column 6</u>
Line 45, "pluraLity" should read as --plurality--.

Signed and Sealed this

Thirty-first Day of March, 2009

JOHN DOLL
*Acting Director of the United States Patent and Trademark Office*